United States Patent Office 3,268,459
Patented August 23, 1966

3,268,459
COPOLYMER SOLUTION OF ACRYLAMIDE-ETHYLENICALLY UNSATURATED MONOMER, AND WATER SOLUBLE CELLULOSE ETHER
Herbert O. Luck, Midland, Mich., assignor to The Dow Chemical Company, Midland, Mich., a corporation of Delaware
No Drawing. Filed Dec. 10, 1962, Ser. No. 243,600
9 Claims. (Cl. 260—17)

The present invention relates to a composition and method for sizing glass fibers. More particularly, the invention comprehends coating glass fibers with a film-forming admixture of an acrylamide polymer and a nonionic water-soluble cellulose ether.

At present, most sizes for glass fibers are based upon starch. As will be apparent to those skilled in the art, starch containing compositions support mold growths, and as a result, such sizes undergo comparatively rapid deterioration with the accompanying development of discoloration.

In light of the foregoing, it would be desirable, and it is an object of the invention, to provide a novel size for glass fibers. Another object is to provide a size relatively inert to biological organisms. A further object is to provide a highly pliable size which can be efficiently applied to the fibers in the form of a homogeneous aqueous solution.

It has now been discovered that two polymeric substances, which normally exhibit little or no activity as sizing agents for glass fibers due to the fact that each polymeric substance by itself does not adhere to glass efficiently, provide when mixed together in a common aqueous medium the basis for an excellent size for glass fibers. This newly discovered size has, in fact, superior properties with respect to flexibility and adhesion to glass fibers.

The term "size" as employed herein refers to an adherent coating for glass fibers. Sizing is applied to the fibers to improve their workability in the manufacture of glass textiles, glass insulation and the like composites of glass fibers.

The discovery referred to above comprises as a size forming composition 1 part of an acrylamide polymer and from about 0.1 to about 10 parts, preferably from about 1 to about 5 parts, of a nonionic water-soluble cellulose ether. The size forming compositions applied to the siliceous fibers in the form of an essentially aqueous solution containing from about 0.2 to about 20 percent, preferably, however, no more than about 10 percent, by weight total polymeric material, i.e., the total combined weight of acrylamide polymer and cellulose ether. After application of the solution, the fibers are dried to produce a tough, nontacky film (size) tightly adhered to the fibers.

Aqueous solutions of the film-forming sizing composition are applied to the glass fibers or composite forms thereof by known applicating techniques, such as dipping, spraying, brushing, or rolling, so as to provide the fibers with a uniform coating of the applicating solution. Excess solution, if any, is permitted to drain off the fibers and the wet fibers are dried.

Drying can be accomplished in any convenient manner. For instance, wetted fibers can be dried satisfactorily by storing them at normal room temperatures. Preferably, however, the drying process is accelerated with the utilization of elevated temperatures with, or without, forced air. Elevated temperatures employed for this purpose may range up to the decomposition temperature of the size but generally sufficiently rapid drying rates are achieved at 30° to 70° C.

Whenever it is desired, the size of the present invention is easily removed from the fibers by baking them in the presence of oxygen at an elevated temperature at which oxidation of the organic constituents of the sizing composition is achieved. Normally, this is readily accomplished at temperatures above about 400° C. but below those temperatures at which glass melts.

As employed herein, acrylamide polymers refer to soluble polymers having a molecular weight of at least 10,000 composed of polyalkane chains containing a plurality of carboxamide substituents. Such polymers are obtained by the homopolymerization of acrylamide or methacrylamide, or by the copolymerization of these monomers with other suitable monoethylenically unsaturated compounds copolymerizable therewith. When the comonomer used contains a water solubilizing group as, for example, in copolymers of acrylamide or methacrylamide with acrylic acid, methacrylic acid, maleic acid, vinylbenzyl ammonium compounds (e.g., trimethylvinylbenzyl ammonium chloride), vinylbenzene sulfonic acid, N-vinyl oxazolidinone, N-vinyl pyrrolidinone, N-vinyl morpholinone, vinyl alcohol and the like, the copolymer may contain a substantial proportion of such comonomer. A preferred acrylamide polymer corresponds to a copolymer of 70 to 99 percent acrylamide and 30 to 1 percent acrylic acid. Such polymers are conventionally obtained by polymerizing acrylamide under conditions such that from 1 to 30 percent of the available carboxamide groups are hydrolyzed to carboxylic groups. Other suitable comonomers containing no such water solubilizing groups include, for example, ethylene, butylene, styrene, methyl or ethyl esters of acrylic and methacrylic acids, vinyl chloride, vinylidene chloride, acrylonitrile, vinyl acetate, vinyl propionate, methylvinyl ether and propylvinyl ether. With such hydrophobic monomers, the amount used must not be so great as to impair the water solubility of the resulting copolymer. In any event, the required acrylamide homopolymers and copolymers are essentially water-soluble polymers having little or no cross-linking between the polymer chains and contain in polymerized form at least 50 mole percent of a carboxamide substituted monomer.

The above-described acrylamide polymers are known to the art. They are prepared by any of several known techniques which fundamentally comprise dispersing the monomers in a suitable solvent medium such as water in the presence of a chemical free radical catalyst. Polymerization is then conducted under controlled temperature conditions within the range from about 40 to 140° C. Depending upon the temperature conditions utilized and the nature of the reactants, it may be necessary in some instances to conduct the polymerization reaction in a pressurized system. While the polymer sols thus prepared can be used directly, the polymer is usually recovered from the polymerization system as a solid product. Vacuum drying or any other convenient separatory technique, or combination of techniques, can be utilized effectively for this purpose.

The nonionic cellulose ethers employed herein can be any one or more of the water-soluble cellulose derivatives which include hydroxyethyl cellulose, methyl cellulose, ethyl cellulose, hydroxyethyl methyl cellulose, hydroxypropyl methyl cellulose and the like cellulose ethers. Methods for the preparation of cellulose ethers are well known in the art.

Specific cellulose ethers which can be utilized efficiently include methyl cellulose having a methoxyl degree of substitution within the range of 1.6 to 2.7, methyl hydroxypropyl cellulose having a methoxyl degree of substitution within the range from about 1.4 up to 1.9 and a hydroxypropoxyl degree of substitution within the range from about 0.1 up to 0.4. Particular hydroxyethyl cellulose ethers which can be utilized efficiently include those having a hydroxyethoxyl degree of substitution within the range from about 0.7 to about 1.2.

Whether or not an acrylamide polymer or cellulose ether is suitably water soluble is readily ascertained by dispersing a small amount of the polymer or ether in question in water. If it can be dissolved to produce a visually homogeneous solution dilutable with large volumes of additional water, the polymer or ether is satisfactory for the practice of the present invention.

In the preferred mode of carrying out the invention, the acrylamide polymer and water-soluble cellulose ether are each dissolved in separate amounts of water so as to provide homogeneous solutions thereof. These solutions are then mixed and additional water added, if needed, to bring the proportion of total polymer solids within the range of from about 0.5 to about 20 percent by weight of the solution. This solution can be conveniently employed as a dip for either individual glass fibers or composite forms of such fibers. Preferably, however, the solution is sprayed on the fibers. After immersing the fibers in, or spraying them with, the sizing solution, excess liquid is permitted to drain off the fibers. The wet fibers are then allowed to air dry at the ambient room temperature. Depending upon humidity and temperature considerations, the time required for satisfactory drying varies from a minute or less to thirty minutes or more. Upon completion of the drying operation, the fibers have a highly pliable, uniform film of the sizing composition tightly adhered to their surface.

In other operations the applicating solution of the sizing composition is brushed or rolled on the fibers so as to provide a uniform coating of the solution over the surface of the fibers. When this applicating technique is used, it is normally not necessary to utilize a drainage step. Instead, the coated fibers can be directly subjected to a drying environment.

The following examples are further illustrations of the invention, but the invention should not be considered as being limited thereto.

In a specific embodiment, applicating solutions containing varying relative amounts of each of an acrylamide polymer and a hydroxypropyl methyl cellulose ether were prepared and films cast therefrom on glass plates. Each solution was cast at a pH of 6.3 and as a 2 percent by weight aqueous solution of polymer solids. After drying the films, an attempt was made to separate the film from the glass substrate with a metal blade.

The relative amounts of polymers used and the adhesion results of these experiments are shown in the following table. The extent of film adhesion, as evidenced by the resistance to removal from the glass plate, is indicated qualitatively by the words or phrases, very little, fair, good or very good.

| Cellulose ether [1] acrylamide polymer [2] ratio: | Glass adhesion |
|---|---|
| 1:0 | Very little. |
| 20:1 | Do. |
| 5:1 | Fair. |
| 2.5:1 | Very good. |
| 1:1 | Do. |
| 0.2:1 | Good. |
| .05:1 | Very little. |
| 0:1 | Do. |

[1] The cellulose ether had a hydroxypropoxyl degree of substitution of about 0.15 and a methoxyl degree of substitution of about 1.7. A 2 percent by weight aqueous solution of the ether has a viscosity of 50 centipoises at 20° C.
[2] The acrylamide polymer was a polyacrylamide having a molecular weight of at least about 1 million and about 25 percent of the available carboxamide groups hydrolyzed to carboxyl groups.

Sizing of continuous glass fibers is accomplished by extruding glass fibers from a reservoir of molten glass through a platinum die and thence over a moving, continuous fabric belt which is partially submerged in a sizing bath. The bath contains about 10 percent by weight of equal parts of a polyacrylamide having a molecular weight of about 500,000, and about 5 percent of the carboxamide groups hydrolyzed to carboxyl groups, and a methyl cellulose ether characterized by a methoxyl degree of substitution of about 1.9, and a viscosity of 50 centipoises. Having passed over the wetted belt which uniformly coats the fiber with sizing solution, the fiber is air dried and wound on a spool for later use.

If desired for the special effects achieved, various other additives can be incorporated into the sizing bath. Some of these additives are hydrocarbon oils for lubrication, surfactants as emulsifiers, and optional cationic agents to increase size adhesion to the glass.

In a like manner to that of the foregoing example other acrylamide polymers such as polyacrylamide, polymethacrylamide and water-soluble copolymers of acrylamide with 1 or more suitable comonomers such as maleic acid, methacrylic acid, styrene sulfonate, N-vinyl oxazolidinone, 2-aminoethylacrylate, vinyl pyridine, ethylene, butylene, styrene, methyl and ethyl esters of acrylic and methacrylic acids, vinyl chloride, vinylidene chloride, acrylonitrile, vinyl acetate, vinyl propionate, methylvinyl ether and propylvinyl ether can be utilized in place of the above acrylamide polymers to accomplish comparable results. Similarly, other nonionic cellulose ethers, inclusive of water-soluble methyl cellulose ethers and water-soluble hydroxyethyl cellulose ethers, can be employed in the place of the aforementioned hydroxypropyl cellulose ether to produce like results.

What is claimed is:

1. A composition of matter comprising an aqueous solution containing from about 0.2 to about 20 percent by weight of a sizing composition consisting of 1 part by weight of a water-soluble acrylamide polymer obtained by polymerizing monoethylenically unsaturated monomers of which at least about 50 mole percent have a carboxamide substituent, said polymer having a molecular weight of at least 10,000 and from about 0.1 to about 10 parts by weight of a nonionic, water-soluble cellulose ether.

2. A composition of matter comprising an aqueous solution containing from about 0.2 to about 10 percent by weight of a sizing composition consisting of 1 part by weight of a water-soluble acrylamide polymer obtained by polymerizing monoethylenically unsaturated monomers of which at least about 50 mole percent have a carboxamide substituent, said polymer having a molecular weight of at least 10,000 and from about 0.1 to about 10 parts by weight of a nonionic, water-soluble cellulose ether.

3. A composition of matter comprising an aqueous solution containing from about 0.2 to about 20 percent by weight of a sizing composition consisting of 1 part by weight of a copolymer of 70 to 99 mole percent acrylamide and 30 to 1 mole percent acrylic acid and from about 0.1 to about 10 parts by weight of a water-soluble methyl cellulose ether.

4. A composition of matter comprising an aqueous solution containing from about 0.2 to about 20 percent by weight of a sizing composition consisting of 1 part by weight of a copolymer of 70 to 99 mole percent acrylamide and 30 to 1 mole percent acrylic acid and from about 0.1 to about 10 parts by weight of a mixed, water-soluble methyl hydroxypropyl cellulose ether.

5. A composition of matter comprising an aqueous solution containing from about 0.2 to about 20 percent by weight of a sizing composition consisting of 1 part by weight of a copolymer of 70 to 99 mole percent acrylamide and 30 to 1 mole percent acrylic acid and from about 0.1 to about 10 parts by weight of a water-soluble hydroxyethyl cellulose ether.

6. Sized glass fiber having an adherent organic size comprising 1 part by weight of a copolymer of 70 to 99 mole percent acrylamide and 30 to 1 mole percent acrylic acid and from about 0.1 to about 10 parts by weight of a water-soluble methyl cellulose ether.

7. Sized glass fiber having an adherent organic size comprising 1 part by weight of a copolymer of 70 to 99 mole percent acrylamide and 30 to 1 mole percent acrylic acid and from about 0.1 to about 10 parts by weight of a water-soluble, mixed methyl hydroxypropyl cellulose ether.

8. Sized glass fiber having an adherent organic size comprising 1 part by weight of a copolymer of 70 to 99 mole percent acrylamide and 30 to 1 mole percent acrylic acid and from about 0.1 to about 10 parts by weight of a water-soluble hydroxyethyl cellulose ether.

References Cited by the Examiner

UNITED STATES PATENTS 2,886,474   5/1959   Kine et al. _____ 260—17

WILLIAM H. SHORT, *Primary Examiner.*

LOUISE P. QUAST, *Examiner.*

J. NORRIS, *Assistant Examiner.*